US008448473B2

(12) United States Patent
Calderon Degollado

(10) Patent No.: US 8,448,473 B2
(45) Date of Patent: May 28, 2013

(54) GLASS MELTING FURNACE BUILT ENTIRELY WITH REFRACTORY CONCRETE

(75) Inventor: Humberto Calderon Degollado, Nuevo León (MX)

(73) Assignee: Compania Vidriera, S.A. de C.V., Monterrey (Nuevo Leon) (MX)

( * ) Notice: Subject to any disclaimer, the term of this patent is extended or adjusted under 35 U.S.C. 154(b) by 0 days.

(21) Appl. No.: 12/734,225

(22) PCT Filed: Oct. 17, 2007

(86) PCT No.: PCT/MX2007/000121
§ 371 (c)(1),
(2), (4) Date: Aug. 22, 2011

(87) PCT Pub. No.: WO2009/051461
PCT Pub. Date: Apr. 23, 2009

(65) Prior Publication Data
US 2012/0111063 A1    May 10, 2012

(51) Int. Cl.
*C03B 5/00* (2006.01)
(52) U.S. Cl.
USPC .................... 65/374.13; 65/374.1
(58) Field of Classification Search
USPC .................... 65/335–347, 374.13
See application file for complete search history.

(56) References Cited

U.S. PATENT DOCUMENTS

| | | | | |
|---|---|---|---|---|
| 2,119,947 A * | 6/1938 | Blau et al. | ............... | 65/135.2 |
| 2,284,797 A * | 6/1942 | Blau et al. | ............... | 65/27 |
| 2,616,221 A * | 11/1952 | Hanson | ............... | 65/178 |
| 3,294,509 A * | 12/1966 | Soubier et al. | ............... | 65/134.5 |
| 3,306,843 A * | 2/1967 | Beuther et al. | ............... | 208/111.01 |
| 3,708,562 A * | 1/1973 | Sleggs et al. | ............... | 264/30 |
| 3,711,267 A * | 1/1973 | Fentzke | ............... | 65/330 |
| 3,879,210 A * | 4/1975 | LaBar | ............... | 501/128 |
| 4,001,001 A * | 1/1977 | Knavish et al. | ............... | 65/337 |
| 4,055,407 A * | 10/1977 | Heithoff et al. | ............... | 65/27 |
| 4,308,067 A | 12/1981 | Guigonis et al. | | |
| 4,494,974 A * | 1/1985 | Vilk et al. | ............... | 65/337 |
| 4,497,628 A * | 2/1985 | Blanchet et al. | ............... | 432/179 |
| 6,405,564 B1 * | 6/2002 | Takei et al. | ............... | 65/157 |
| 2001/0039813 A1 * | 11/2001 | Simpson et al. | ............... | 65/134.4 |
| 2004/0138048 A1 * | 7/2004 | Anderson | ............... | 501/107 |
| 2005/0037912 A1 * | 2/2005 | El Khiati et al. | ............... | 501/72 |
| 2005/0159294 A1 * | 7/2005 | Boussant-Roux et al. | .... | 501/104 |
| 2011/0291310 A1 * | 12/2011 | Calderon Degollado et al. | ............... | 264/34 |

FOREIGN PATENT DOCUMENTS

| | | |
|---|---|---|
| DE | 10162013 | 7/2003 |
| GB | 275555 | 4/1928 |
| GB | 833238 | 4/1960 |

OTHER PUBLICATIONS

Plibrico Conventional Castable Refractories as viewed at http://www.plibrico.com/refractory_products/monolithic_refractories/index.php?action=page&pageID=2&pageName=Convention al Castable Refractories on Jun. 1, 2012.*

Skurikhin V. et al.; "Traditional and New Refractory Materials for Construction and Repair of Glass-Melting Furnaces", Glass and Ceramics; Springer, New York, vol. 61, No. 9/10, Sep. 1, 2004, pp. 346-351.

(Continued)

*Primary Examiner* — Jodi C Franklin
(74) *Attorney, Agent, or Firm* — Abelman, Frayne & Schwab

(57) ABSTRACT

Glass melting furnace comprised by several sections which are built entirely with refractory concrete of diverse refractory materials according to operation conditions, chemical environment, temperature, and mechanical load to which its several sections are exposed, as well as to the material thickness required, to assure an structural integrity and durability similar to the ones of furnaces of conventional design as well as a lower investment cost.

6 Claims, 4 Drawing Sheets

OTHER PUBLICATIONS

Thomas E. A. et al; "Monolithic Refractories Offer Versatility. A Review of Their Various Glass-Melting Furnace Applications"; Glass Industry Magazine, NY, vol. 70, No. 12, Nov. 10, 1989, pp. 36, 39-40.

Vulkan Verlag GmbH; "Refractory Engineering"; 2005; pp. 113-117.
International Search Report for International Application No. PCT/MX2007/000121 dated May 21, 2008.

* cited by examiner

GLASS MELTING FURNACE BUILT ENTIRELY WITH REFRACTORY CONCRETE

Cross-reference to Related Applications:

This Application is a National Phase of PCT/MX2007/000121, filed 17 Oct. 2007.

BACKGROUND

A. Field of the Invention

This invention is related to glass melting furnaces and more specifically to glass melting furnaces for the manufacture of glass containers or flat glass, entirely built with refractory concrete.

B. Description of the Related Art

The conventional design of furnaces for the glass production includes the use of masonry, that is to say, the use of bricks and blocks assembled using mortar and/or cement to build each one of the sections that constitute the unit. These refractory materials are chosen in order to attain an useful life of at least 12 years before requiring a total reconstruction.

The repairing of conventional furnaces used to produce glass, has been traditionally developed, by replacing the damaged or worn-out sections, using new bricks or blocks, incorporating them to the furnace's sections using mortar and/or cement.

However, when refractory concretes appeared, the repairing of furnace's sections was simplified because now it is only needed to remove the refractory bricks or blocks from the affected areas and to fill in these areas directly with refractory cement, being not required to place refractory bricks.

Examples of refractory cements for glass melting furnaces, are described in the U.S. Pat. No. 7,176,153 of Anderson, for an alumina, zirconium and silica refractory system that, as it is set forth in the said patent, can be used to produce blocks or can be used directly in a worn-out portion of the furnace; U.S. Pat. No. 6,313,057 of Brown et al, for a melted silica refractory material made up of granulated quartz, that contains a calcium oxide binder; U.S. Pat. No. 6,158,248 of Beppu, for a melted cast refractory of alumina, zirconium and silica; U.S. Pat. No. 6,554,058 among others.

Nevertheless, all these refractory cements have been used only to manufacture blocks and for repairing worn-out areas of furnace's sections.

This invention considers the design of a furnace with sections entirely built with refractory concretes that are total and hermetically joined forming a monolithic furnace. The achieved benefits hereof are the following: higher airtightness that improves the thermal efficiency, thus saving fuel; more durability of critical areas due to a reduction in the chemical erosion and corrosion, as a result of the absence of joints among the structural components. It is possible to achieve an important reduction in construction time due to the design of large elements, because the sections are directly shaped at the construction site, likewise, an important reduction is achieved in the warm-up and the operation startup time.

OBJECTIVES OF THE INVENTION

Thus, one main objective of this invention is to provide a glass melting furnace, entirely built with refractory concrete.

It is an additional objective of this invention is to provide a glass melting furnace, of the above described characteristics, with better airtightness that improves its thermal efficiency resulting in a fuel saving.

It is a further main objective of this invention, to provide a glass melting furnace, with the above described characteristics that has a longer durability of its critical areas, due to the reduction of chemical erosion and corrosion, as a result of the lack of joints among the structural components.

It is jet an additional objective of this invention, to provide a glass melting furnace, with the above described characteristics, with which because of the design of large elements, it is possible to achieve an important reduction in its construction time, as well as in its warm-up time at the operation startup stage.

These and other objectives and advantages of the glass melting furnace, built with refractory concrete, of this invention, can be viewed by the experts in the area in the following detailed description of the preferred embodiments of the invention, which will be within the scope of the invention claimed.

DETAILED DESCRIPTION OF THE INVENTION

The glass melting furnace of this invention will be described below making reference to the specific embodiments of the same and to the drawings enclosed as figures, where the same signs refer to the same parts of the shown figures.

Figure 1:
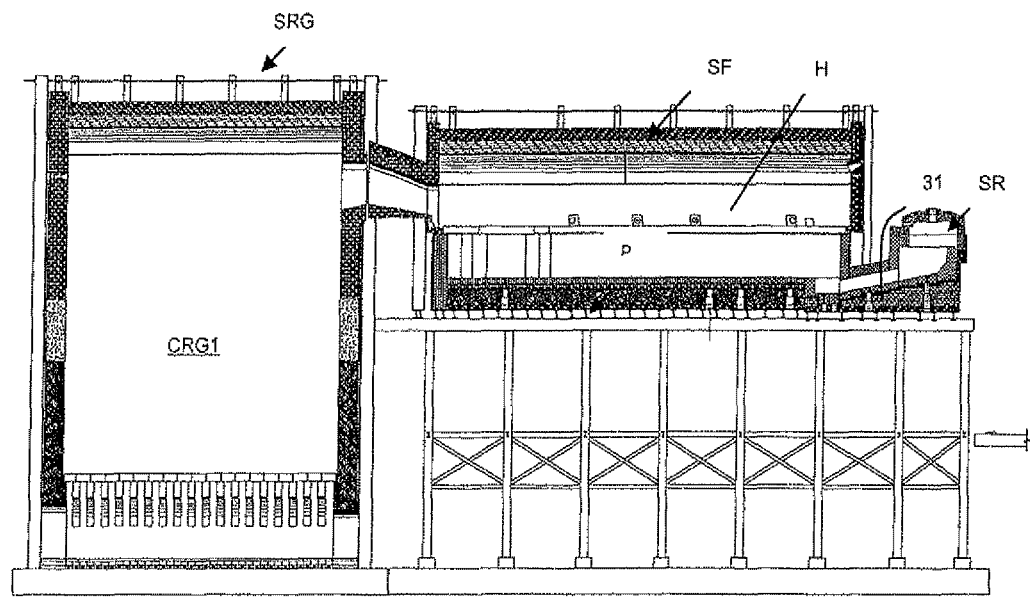
FIG. 1, is a cross section view of a side elevation a glass melting furnace for the manufacturing of containers, schematized, showing its several sections made up of several materials according to its coding, according to this invention.
Figure 2:
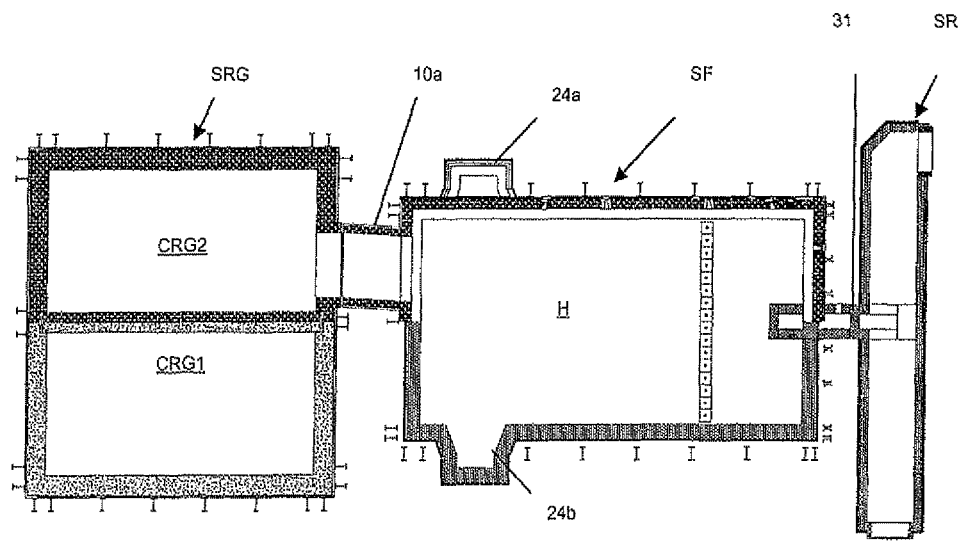
FIG. 2, is an upper plant cross section view of the furnace in FIG. 1, showing several sections made up of several materials according to its coding.

A typical glass melting furnace, known as Regenerative Furnace with "End Port" includes sections that have specific functions such as: one melting section SF, one refining section SR and one regeneration section SRG (FIGS. 1 and 2), each of which, according to this invention, is built entirely with refractory concrete made of specific materials and features and they will be described in detail below in the sequence in which this type of furnace is built.

Regarding to the type of materials used to build the furnace to be described in the following, it is important to state that the calculated thickness according to the design is such that the useful life of the operative unit is the same as the one of a conventional furnace, that is, at least 12 years of useful life until its next repairing, during this period of useful life minor maintenance services in warm conditions are considered to preserve the unit, as it is a common practice in current glass furnaces.

Regeneration Section:

Regenerative Chambers.

Figure 3:
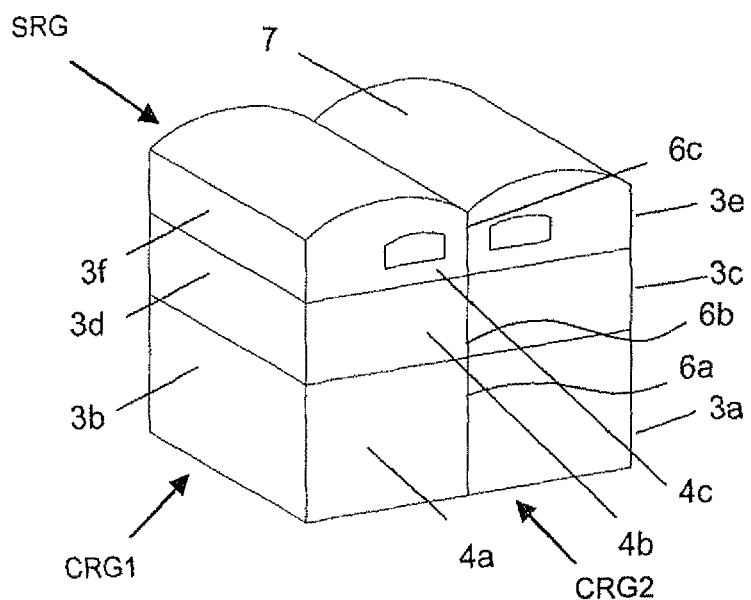
FIG. 3, is a conventional perspective view of the regeneration section, showing its regenerating chambers with its side, front and rear walls and vaults.

The regenerative chambers CRG1 and CRG2 (FIGS. 2 and 3) of the furnace H are subject to thermal changes due to the burn cycle from one side to another of the furnace H, also, they are subject to differential temperatures from the combustion gas exhaust 1 of the melting section SF of approximately 1550° C. to the base 2 of the regenerative chambers CRG1 and CRG2 from about 400 to 500° C., therefore materials that remain stable under this operation conditions were chosen.

Also, due to the changing condition of combustion air intake (21% O2) and gases exhaust (4-5% O2) they are exposed to oxidation-reduction changes of state, at the same time that they present the above mentioned thermal gradient.

The following alumina-silica refractory materials were chosen to build the regenerative chambers CRL1 and CRL2, which, because of their amphoteric characteristic, are able to resist the acid environments which are present due to the combustion and basic gases of the materials of the side and central walls of the regenerators.

The lower area, side walls 3a and 3b, front wall 4a, rear wall 5a and central wall 6a (FIG. 3) which are exposed to temperatures from about 400 to 800° C., are built with alumino-silicate refractory concrete.

The middle area, side walls 3c and 3d, front wall 4b, rear wall 5b and central wall 6b (FIG. 3), which are exposed to temperatures from about 800 to 1100° C., are built with high alumina and low calcium oxide refractory concrete.

The upper area, side walls 3e and 3f, front wall 4c, rear wall 5c and central wall 6c (FIG. 3), which are exposed to operation temperatures from about 1100 to 1500° C., are built with high alumina and low calcium oxide refractory concrete.

Finally, the vault 7 and overvault 8 that seals the regenerative chambers CRG (FIG. 3), are built with high silica and low calcium oxide silicon refractory concrete.

These refractory materials offer high resistance to pressure under burning conditions and high resistance to sudden temperature changes due to changes in burning cycles. Also, at work temperatures they have a high chemical resistance to condensable gases and steams, such as the sodium sulphate.

Figure 4:
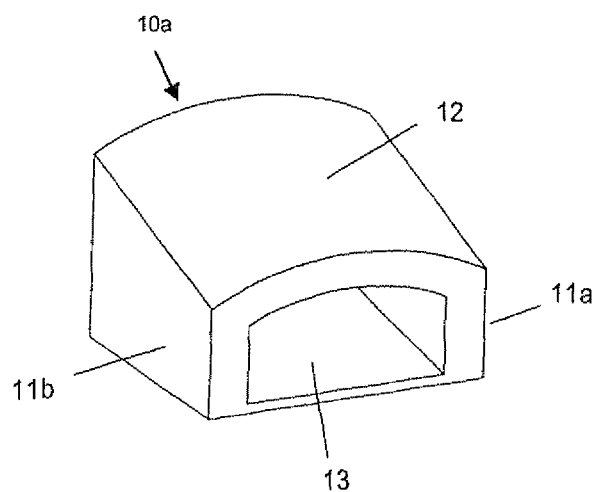
FIG. 4, is a conventional perspective view of the throat connecting the regeneration section with the melting section.

Ports:

In order to build ports 10a and 10b that connect regenerative chambers CRG1 and CRL2 (FIGS. 2 and 4) to the melting section SF, a high alumina (>99.0%) and low calcium oxide (<0.2%) refractory was considered, the chemical stability of the alpha alumina used, prevents the reactivity with other materials, also, the presence of low calcium oxide content prevents the reactivity with other compounds such as heavy metals from fossil fuels, making a high chemical resistance monolithic refractory. In addition, the thermal stability provided by the low expansion coefficient, allows an excellent behavior as a joining piece between the melting section and the regenerative chambers CRG1 and CRG2 due to the change of thermal cycles during the furnace operation, therefore:

each of the ports 10a and 10b, their side walls 11a and 11b, vault 12 and floor 13 (FIG. 4) are built in a monolithic form with high alumina refractory concrete.

Figure 5:
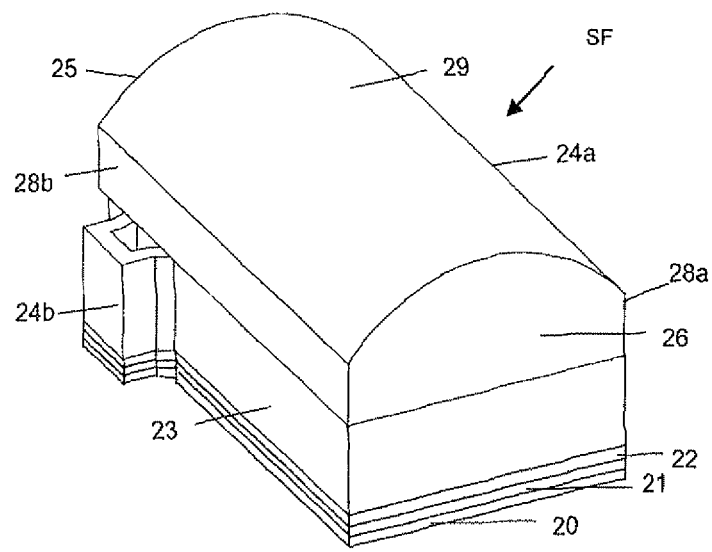
FIG. 5, is a conventional perspective view showing the melting section of the monolithic furnace of this invention.
Figure 6:
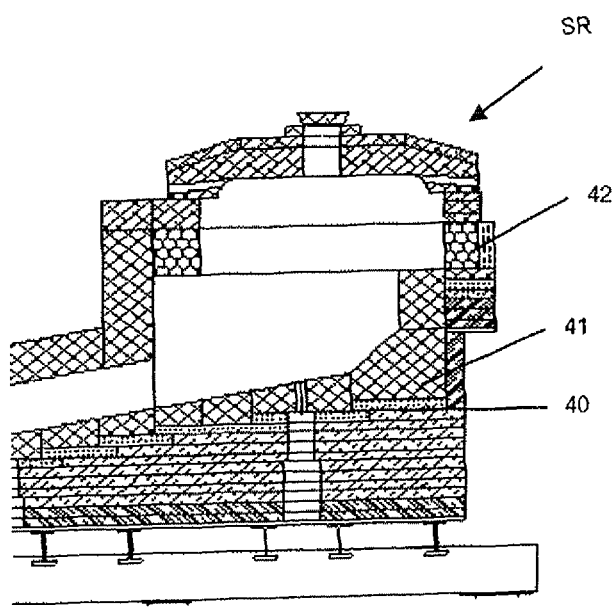
FIG. 6, is a detailed, enlarged cross section of a side elevation view, of the refining section of FIG. 1; and, FIG. 7, is a diagram of the codes of the materials that form part of the furnace.
Figure 7:
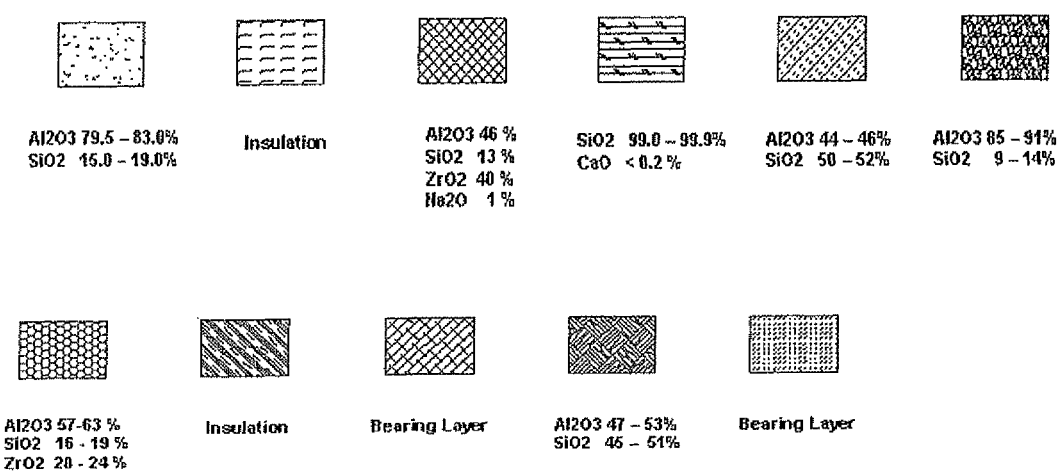

Melting Section:
Refractory in Contact with Glass:

The refractory materials in contact with glass are of the zirconium-alumina-silica type, which include zirconium oxide in their chemical composition because, due to the presence of the same, it provides to the the products a higher resistance to corrosion, abrasion and compression. For this reason, the materials that are in contact with glass in the furnace H (FIGS. 1, 2 and 5) of this invention, include the use of refractory concrete to form monolithic pieces with zirconium-alumina-silica refractory material with 20-24% of zirconium oxide content, as it is set forth in U.S. Pat. No. 4,053,321, therefore:

Floor:
The lower layer 20 of floor P of the melting section SF (FIG. 5) is built with alumino-silicate refractory concrete;
The middle layer 21 of floor P (FIG. 5) is built with high alumina refractory concrete; and
The upper layer 22 of floor P (FIG. 5) is built with zirconium-alumina-silica refractory concrete. This last layer is the one that is in contact with the glass.

Cup:
The cup 23 of melting section SF (FIG. 5), including both side chargers 24a and 24b, are built with zirconium-alumina-silica refractory concrete.

Superstructure:
The superstructure SS of the furnace H, that comprises the overcup 25, front wall 26, rear wall 27 and side walls 28a and 28b of furnace H (FIG. 5), requires high temperature resistant materials, because they are exposed to flames, and that provide resistance to combustion gases and gas and volatile compounds environment which come from glass manufacturing, such as the raw material dragging "carry over", sodium oxide, sodium hydroxide, etc. That is why when choosing the materials to form the superstructure SE, high alumina refractory materials were used, which provide a high fusion point and chemical resistance to the corrosion of the alkaline environment of the glass and to the acid environment of the combustion gases because of its neutral feature. Also, more specifically, due to its low calcium oxide concentration in its structure, the possibility of forming liquid phases is reduced, avoiding any dripping problem and generation of defects in the melted glass, therefore:

The overcup 25, front wall 26, rear wall 27 and side walls 28a and 28b of the melting section SF (FIG. 5), are built with high alumina and low calcium oxide refractory concrete.

Vault:
The vault 29 is the structural element of the melting section SF (FIG. 5) that closes the upper space of the glass melting furnace H and this design considers refractory concretes with high SiO2 (>99%) and low calcium oxide (<0.2%) concentrations different from the common refractory which uses from 2.5 to 3.5% CaO. The manufacture in only one piece of the vault 29 prevents all kind of union joints among blocks and permits a better airtightness with the furnace walls, significantly reducing the appearance of joints and cracks. This condition together with the high SiO2 content and low CaO concentration reduces the potential reactivity between the volatile phases of alkalis of furnace H and the silica, preventing the reactivity between these compounds. On the other hand, it reduces the potential generation of corrosion points among joints because of the lack of heat and steam leaks that prevent the formation of liquid phases which form the "rat holes".

Also, the sealing of the vault 29, called overvault 30 installed once the heating process of the Furnace H has finished (FIG. 5), eliminates any crack or leak of heat left in the vault during the heating of the same, maintaining the airthickness of the system, therefore:

The vault 29 and sealing overvault 30 (FIG. 5) are built with silicon refractory concrete with high silica and low calcium oxide contents;

Throat:
The Throat 31 (FIGS. 1 and 2) is built with zirconium-alumina-silica refractory concrete.

Refining Section:
  The base 40 of the refiner cup floor RC is built with alumina-silicate refractory concrete; and
  The upper body 41 of the refiner cup RC and the upper layer 42 in contact with the glass, are built with zirconium-alumina-silica refractory concrete.

The chosen group of refractory concretes permits the construction of a monolithic glass furnace reducing its construction time compared against common furnaces made up of preformed blocks, as well as a low manufacture cost due to the low cost of the materials used while the design and calculation of the thickness of the involved materials provides an equal or longer useful life than the one of conventional furnaces, that is at least 12 years, it can also be mentioned that an additional advantage is the considerable reduction of time spent repairing the unit after the useful life of the furnace, since there is a fixed base of the previous furnace, thus allowing important savings in materials and time reduction to restart the unit's operation.

This development considers the design of monolithic pieces (see table of parts) to form the glass furnace, and the calculation of the thickness of the materials of each part to keep the useful life of the glass furnace the same as a conventional furnace.

Preferred Sample of Embodiment with Materials and Thicknesses Used in a 220-Ton/Day Furnace Regeneration Section.

Regenerative Chambers:
  In the lower area, the side walls 3a and 3b, front wall 4a and rear wall 5a were built with alumina-silicate refractory concrete which contains 36-38% alumina with a thickness of 28.5" in the lower part and 24" in the upper part, and central wall 6a with a thickness of 33" in the lower part and 24" in the upper part respectively, that are exposed to a temperature of around 400 to 800° C.
  In the middle area, the side walls 3c and 3d, front wall 4b, rear wall 5b and central wall 6b, that are exposed to temperatures of around 800 to 1100° C., were built with high alumina refractory concrete with $Al_2O_3$ content with a thickness of 24".
  In the upper area, the side walls 3e and 3f, front wall 4c, rear wall 5c and central wall 6c, that are exposed to temperatures of around 1100 to 1500° C., were built with high alumina refractory concrete with a 85 to 91% content of $Al_2O_3$, with a thickness of 24".

Vault 7 and Sealing Overvault 8, were built with silicon refractory concrete with high silica and low calcium oxide content, with a thickness of 13.5" in the vault 7 and a thickness of 2" in the sealing overvault.

Ports:
  Each of the ports 10a and 10b were built in a monolithic form with high alumina refractory concrete with $Al_2O_3$ contents of 85 to 91%, with side walls 11a and 11b with a thickness of 9", with a vault 12 thickness of 12", and a floor 13 with a variable thickness of 9" next to chambers and 4.5" in the nose of the floor of the port.

Melting Section.
Refractory in Contact with Glass:
Floor:
  The lower layer 20 of floor P was built with alumino-silicate refractory concrete with a 47-52.5% alumina content with a thickness of 18";
  The middle layer 21 of floor P was built with high alumina refractory concrete with a 85-91% $Al_2O_3$ content with a thickness of 8"; and
  The upper layer 22 of floor P was built with zirconium-alumina-silica refractory concrete with a 20-24% zirconium oxide content with a thickness of 6".

Cup:
  The cup 23 was built with zirconium-alumina-silica refractory concrete with a 20-24% zirconium oxide content with a thickness of 18" including both chargers.

Superstructure:
  The overcup 25, its front wall 26, rear wall 27 and side walls 28a and 28b were built with high alumina refractory concrete with a 85-91% $Al_2O_3$ content and low calcium content, with an overcup thickness of 8" and side walls 28a and 28b, front wall 26 and rear wall 27 with a thickness of 12".

Vault:
  The vault 29 and sealing overvault 30 were built with silicon refractory concrete with high silica content and low calcium oxide content. with a thickness of 13.5" in the vault in the vault 29, and a thickness of 2" in the sealing overvault.

Throat:
  The throat 31 was built with zirconium-alumina-silica refractory concrete with a 20-24% zirconium oxide content.

Refining Section.
  The Base 40 of the cup floor was built with alumino-silicate refractory concrete with a 47-52.5% alumina content and with a thickness of 7.5".
  The upper body 41 of the cup and the upper layer 42 in contact with glass, were built with zirconium-alumina-silica refractory concrete with a 20-24% zirconium oxide content with a thickness of 10" in the upper body 41 and with a thickness of 6" in the upper layer 42 in contact with glass.

All of the above is in the understanding that the aforesaid description of the invention, is only provided in order to show the specific embodiments of the same and the better way to develop it as of the time when this application for patent is filed and the invention will not be limited to these, but its scope must be considered regarding the enclosed claims.

The invention claimed is:

1. A glass melting furnace comprising melting and refining sections, each melting and refining section being formed of diverse sections to form a complete furnace, the diverse sections of the furnace being ports, melter, throat and refiner the improvements being characterized in that each of the diverse sections of the melting and refining sections are completely built, in situ, with refractory concrete of one or more different compositions, which are hermetically joined forming a monolithic furnace, said different compositions being selected from the group consisting of alumina, alumina-silica, zirconium-alumina-silica, alumina-calcium, silica-calcium, silica-calcium-alumina and mixture thereof, each of the refractory concretes being selected depending on the function to be performed in the furnace, characterized in that the melting section comprising a regeneration section totally built with refractory concrete which comprises;
  a lower area including side walls, front wall, rear wall and a central wall that are built with alumino-silicate refractory concrete, wherein the alumino-silicate refractory concrete of the side walls, front, rear and central lower walls comprises about 36-38% of alumina;
  a middle area with side walls, front wall, rear wall, and central wall, which are built with high alumina refractory concrete, wherein the high alumina refractory concrete in the middle area of side walls, front, rear and central walls comprises about 79.5-83% of alumina;
  an upper area with side walls, front wall, rear wall, and central wall, which are built with high alumina and low calcium oxide refractory concrete, wherein the high alumina refractory concrete in the upper area of the side walls, front, rear and central walls comprises about 85 to 91% of alumina; and a vault and sealing overvault which are built with high silica and low calcium oxide content silicon refractory concrete, wherein the high silica and low calcium oxide content silicon refractory concrete of the vault and sealing overvault comprises about 90 to 99.9% of silica, less than 0.2% of calcium oxide and less than 0.2% of alumina.

2. The glass melting furnace, according to claim 1, characterized in that each port comprises: one floor, walls and one vault, that are built in a monolithic foam with high alumina and low calcium oxide content refractory concrete, where alumina is in a range from 85 to 91%.

3. The glass melting furnace, according to claim 1, characterized in that the melter comprises:

a cup and at least one charger which are built with zirconium-alumina-silica refractory concrete, where the zirconium oxide is in a range from 20 to 24%;

an overcup, side walls, front and rear walls built with high alumina and low calcium oxide refractory concrete, where the alumina is in a range from 85 to 91%;

one vault and one ceiling overvault which are built with with a refractory concrete which comprises approximately 90-99.9% of silica, less than 0.2% of calcium oxide and less than 0.2% of alumina, a floor lower layer built with alumino-silicate refractory concrete, where the alumina is in the range from 45 to 52.5%;

a floor middle layer built with high alumina and low calcium content refractory concrete, where the alumina is in the range from approximately 85 to 91%; and a floor upper layer built with zirconium-alumina-silica refractory concrete, where the zirconium is in the range from approximately 20 to 24%.

4. The glass melting furnace, according to claim 1, characterized in that the throat is built with zirconium-alumina-silica refractory concrete, where the zirconium is in the range from approximately 20 to 24%.

5. The glass melting furnace, according to claim 1, characterized in that the refiner comprises: a cup floor base built with alumino-silicate refractory concrete; a cup upper body and an upper layer in contact with glass built with zirconium-alumina-silica refractory concrete.

6. The glass melting furnace, according to claim 3, characterized in that the alumina-silica refractory concrete of the cup's base and the refiner's floor comprising approximately 47-52.5% of alumina.

* * * * *